(12) United States Patent
Tasaka et al.

(10) Patent No.: US 6,458,893 B1
(45) Date of Patent: Oct. 1, 2002

(54) THERMOPLASTIC RESIN COMPOSITION

(75) Inventors: Michihisa Tasaka, Tokyo (JP); Toshimi Yamanaka, Tokyo (JP)

(73) Assignee: Riken Vinyl Industry Co., Ltd., Tokyo (JP)

( * ) Notice: Subject to any disclaimer, the term of this patent is extended or adjusted under 35 U.S.C. 154(b) by 0 days.

(21) Appl. No.: 09/904,977

(22) Filed: Jul. 13, 2001

(30) Foreign Application Priority Data

Jul. 24, 2000 (JP) ........................................ 2000-223021

(51) Int. Cl.$^7$ ..................... C08L 23/08; C08L 29/04; C08L 53/02; C08L 75/04
(52) U.S. Cl. .................... 525/222; 525/232; 525/240
(58) Field of Search ............................. 525/222, 232, 525/240

(56) References Cited

PUBLICATIONS

European Search Report Dated Feb. 6, 2002.
Partial European Search Report dated Nov. 5, 2001.

*Primary Examiner*—Nathan M. Nutter
(74) *Attorney, Agent, or Firm*—Pitney, Hardin, Kipp & Szuch LLP

(57) ABSTRACT

A thermoplastic resin composition comprising 40 to 95 parts by weight of (a) a saponified ethylene-vinyl acetate copolymer resin and 60 to 5 parts by weight of (b) at least one selected from the group consisting of copolymers of a vinyl aromatic compound with a conjugated diene compound, and hydrogenated derivatives thereof, characterized in that the saponified ethylene-vinyl acetate copolymer resin (a) has an ethylene content of 40 to 95 wt % based on a weight of the saponified ethylene-vinyl acetate copolymer resin and a degree of saponification of the vinyl acetate of at least 80 wt % and (b) at least one selected from the group consisting of copolymers of a vinyl aromatic compound with a conjugated diene compound is selected from the group consisting of (b-1) block copolymers of a vinyl aromatic compound with a conjugated diene compound, and hydrogenated derivatives thereof and (b-2) hydrogenated random copolymers of a vinyl aromatic compound with a conjugated diene compound, the copolymers having a vinyl aromatic compound content of at most 50 wt %, a number average molecular weight(Mn) of from 5,000 to 1,000,000, a polydispersity(Mw/Mn) of at most 10, and a content of vinyl bonds derived from the conjugated diene compound of at least 10% based on bonds derived from the conjugated diene compound.

6 Claims, No Drawings

THERMOPLASTIC RESIN COMPOSITION

FIELD OF THE INVENTION

The present invention relates to a thermoplastic resin composition. More specifically, the present invention relates to a thermoplastic resin composition comprising a specific saponified ethylene-vinyl acetate copolymer resin, a vinyl aromatic-conjugated diene copolymer and/or a hydrogenated derivative thereof. The composition has a good moldability and is suitably used for toys and automobile interior parts.

DESCRIPTION OF THE PRIOR ART

A rotational powder molding method is suitable for molding articles of complicated shapes. The method gives a high production yield and a uniform thickness of a molded article with ease. Thus, the method is widely used to produce toys and automobile interior parts. In the rotational powder molding, raw material powder which has not stuck to a mold is recovered and reused in a subsequent molding operation. The recovered powder tends to agglomerate after it is heated in the precedent molding to partly melt on the surface. The granules of agglomerated powder tend to cause pinholes in molded articles. Pinholes also take place in an unmelted part of a material where a molding temperature is lower than the melting. Moreover, when a gas evolves from the material, conformity of a shape of a molded article to a mold is deteriorated. Therefore, it is desired to use a raw material that meets product requirements and, moreover, does not show the aforesaid problems in molding.

As raw material resins for rotational powder molding, use is made of polyvinyl chloride resins, polyolefinic elastomers, and thermoplastic polyurethane elastomers. The polyvinyl chloride resin contains a large quantity of a low molecular weight plasticizer and, therefore, a molded article therefrom tends to lose a soft-to-touch property at a temperature lower than the solidifying point of the plasticizer. In a long term use, there arises a problem that a matting effect and a soft-to-touch property are lost due to migration of the plasticizer to the molded articles' surface. The polyolefinic elastomer is cheaper and has good weatherability, but is poor in moldability and scratch resistance. Some compositions were examined which had improved scratch resistance through compositional designs and modification of surfaces, e.g., by coating. However, they are costly and, therefore, not practical. The thermoplastic polyurethane elastomer has a longer molding cycle time and tends to be stringy or to agglomerate in molding. In addition, a molded article therefrom does not have a smooth backside. When a foaming resin is shaped on the backside, an evolved gas leaks from the uneven backside surface. Further, it is expensive and inferior in weatherability and resistance to flame.

An ethylene-vinyl acetate copolymer(EVA) or a saponified derivative thereof, an ethylene-ethyl acrylate copolymer (EEA) can be molded at a lower temperature than the aforesaid resins. A composition is described in Japanese Patent Publication No.H2-60687/1990, which comprises a saponified derivative of an ethylene-vinyl acetate copolymer and a copolymer of a vinyl aromatic compound with a conjugated diene compound or a hydrogenated derivative thereof. However, the present inventors have found that the composition is not suitable for the rotational powder molding.

A composition containing a thermoplastic polyurethane elastomer can be molded at a temperature similar to that for the saponified derivative of an ethylene-vinyl acetate copolymer. However, as described above, molded articles therefrom are inferior in weatherability and backside smoothness.

SUMMARY OF THE INVENTION

An object of the present invention is to provide a thermoplastic elastomeric composition which solves the aforesaid problems in rotational powder molding, i.e., to provide a composition which does not generate gas, pinholes, or agglomeration and which provides molded articles having superior weatherability, resistance to flame and smooth backside.

The present inventors have found that the above problems can be solved by using a saponified ethylene-vinyl acetate copolymer having a specific ethylene content and a degree of saponification and a copolymer of a vinyl aromatic compound and a conjugated diene compound. Thus the present invention is (1) a thermoplastic resin composition comprising 40 to 95 parts by weight of (a) a saponified ethylene-vinyl acetate copolymer resin and 60 to 5 parts by weight of (b) at least one selected from the group consisting of copolymers of a vinyl aromatic compound with a conjugated diene compound, and hydrogenated derivatives thereof, characterized in that the saponified ethylene-vinyl acetate copolymer resin (a) has an ethylene content of 40 to 95 wt % based on a weight of the saponified ethylene-vinyl acetate copolymer resin and a degree of saponification of the vinyl acetate of at least 80 wt % and (b) at least one selected from the group consisting of copolymers of a vinyl aromatic compound with a conjugated diene compound ,and hydrogenated derivatives there of is selected from the group consisting of (b-1) block copolymers of a vinyl aromatic compound with a conjugated diene compound, and hydrogenated derivatives thereof and (b-2) hydrogenated random copolymers of a vinyl aromatic compound with a conjugated diene compound, the copolymers having a vinyl aromatic compound content of at most 50 wt %, a number average molecular weight (Mn) of from 5,000 to 1,000,000, a polydispersity(Mw/Mn) of at most 10, and a content of vinyl bonds derived from the conjugated diene compound of at least 10% based on bonds derived from the conjugated diene compound. Preferred embodiments of the above invention are as follows.

(2) The thermoplastic resin composition described (1) above, wherein component (b) is a hydrogenated styrene-isoprene-styrene block copolymer having a weight average molecular weight of from 5,000 to 1,500,000, wherein 70 to 100 wt % of the isoprene is in 1,4-micro structure and at least 90% of aliphatic double bonds derived from the isoprene are hydrogenated.

(3) The thermoplastic resin composition described (1) above, wherein component (b) is a hydrogenated styrene-butadiene random copolymer wherein at least 70% of olefinic unsaturated bonds are hydrogenated.

(4) The thermoplastic resin composition described in any one of (1) to (3) above, wherein the composition further comprises 0.01 to 3 parts by weight of (c) an organic peroxide and 0.01 to 5.5 parts by weight of (d) a cross-linking aid, based on 100 parts by weight of component (a) and component (b) in total.

(5) The thermoplastic resin composition described in any one of (1) to (4) above, wherein the composition further comprises 1 to 20 parts by weight of (e) (poly) hydroxyalkyl (meth)acrylate, based on 100 parts by weight of component (a) and component (b) in total.

(6) The thermoplastic resin composition described in any one of (1) to (5) above, wherein the composition further comprises at least one component selected from the group consisting of 5 to 150 parts by weight of (f)a thermoplastic polyurethane resin, 0.1 to 20 parts by weight of (g) a liquid polybutadiene, 0.05 to 5 parts by weight of (h) an unsaturated carboxylic acid or a derivative thereof, 0.05 to 30 parts by weight of (i) a peroxide-decomposing polyolefin resin, and 0.05 to 30 parts by weight of (j) a peroxide-crosslinking polyolefin resin, wherein a total amount of component (a) and component (b) is 100 parts by weight.

PREFERRED EMBODIMENTS OF THE INVENTION

The components constituting the present composition will be explained below.

Component (a) Saponified Ethylene-Vinyl Acetate Copolymer

The present composition is characterized in that it contains a saponified ethylene-vinyl acetate copolymer resin, hereinafter referred to as "EVOH." The EVOH in the composition improves weatherability of the composition and makes the backside of a molded article have smoother.

The EVOH has an ethylene content of from 40 to 95 wt %, preferably from 60 to 90 wt %, and a degree of saponification of the vinyl acetate component of at least 80 wt %, preferably at least 90 wt %. If the ethylene content is lower than 40 wt %, the composition has worse heat resistance. Meanwhile, softness of the composition is deteriorated, if the ethylene content is higher than 95 wt %. If the degree of saponification is smaller than 80%, the composition has worse heat resistance.

The EVOH has a melt flow rate (MFR), determined according to the Japanese Industrial Standards (JIS) K6924-2 at 190° C. under a load of 21.18N, of from 10 to 400 g/10 min., preferably from 20 to 250 g/10 min. If the MFR is less than 10 g/10 min., the composition has worse flowability. If MFR exceeds 400, mechanical strength and heat resistance are deteriorated.

(b)Vinyl Aromatic Compound-Conjugated Diene Compound Copolymer and/or Hydrogenated Derivative Thereof The present component (b) is at least one selected from the group consisting of (b-1) block copolymers of a vinyl aromatic compound with a conjugated diene compound and hydrogenated derivative thereof, and (b-2) hydrogenated random copolymers of a vinyl aromatic compound with a conjugated diene compound. The vinyl aromatic compound in the component (b) may be one or more selected from, for instance, styrene, tert.-butylstyrene, α-methylstyrene, p-methylstyrene, divinylbenzene, 1,1-diphenylstyrene, N,N-diethyl-p-aminoethylstyrene, vinyl- toluene and p-tert.-butylstyrene, with styrene being preferred.

The conjugated diene compound may be one or more selected from, for instance, butadiene, isoprene, 1,3-pentadiene, and 2,3-dimethyl-1,3-butadiene, with butadiene and/or isoprene being preferred.

The block copolymer and/or the hydrogenated derivative thereof (b-1), hereinafter collectively referred to as "(hydrogenated) block copolymer", consists of at least one polymeric block (A) composed mainly of a vinyl aromatic compound and at least one polymeric block (B) composed mainly of a conjugated diene compound, and has a structure, for example, A-B, A-B-A, B-A-B-A or A-B-A-B-A. When two or more of each polymeric block (A) and polymeric block (B) are present, they may be same with or different from each other in structure. Component(b-1) contains 5 to 60% by weight, preferably 20 to 50% by weight, of the vinyl aromatic compound. The polymeric block (A) composed mainly of a vinyl aromatic compound consists solely of a vinyl aromatic compound or is a copolymeric block comprising more than 50% by weight, preferably at least 70% by weight, of a vinyl aromatic compound with a conjugated diene compound and/or a hydrogenated conjugated diene compound (hereinafter referred to as (hydrogenated) conjugated diene compound).

Preferably, the polymeric block (B) composed mainly of a (hydrogenated) conjugated diene compound is composed solely of a (hydrogenated) conjugated diene compound or is a copolymeric block comprising more than 50% by weight, preferably at least 70% by weight, of a (hydrogenated) conjugated diene compound with a vinyl aromatic compound. In the polymeric block (A) composed mainly of a vinyl aromatic compound or the polymeric block B composed mainly of a (hydrogenated) conjugated diene compound, the vinyl aromatic compound or the (hydrogenated) conjugated diene compound may be distributed at random, in a tapered manner (i.e., a monomer content increases or decreases along a molecular chain), in a form of a partial block or in mixture thereof.

Any microstructure may be selected in the polymeric block B composed mainly of the conjugated diene compound. It is preferred that the block derived from butadiene has 20 to 50%, more preferably 25 to 45%, of 1,2-microstructure. In the block derived from isoprene, it is preferred that 70 to 100% by weight of isoprene is in 1,4-microstructure and at lest 90% of the aliphatic double bonds derived from isoprene is hydrogenated. The block derived from a mixture of butadiene and isoprene preferably has less than 50%, more preferably less than 25%, most preferably less than 15% of 1,2-microstructure. Many methods were proposed for the preparation of such block copolymers. As described, for instance, in JP Publication 40-23798/1965, block polymerization may be carried out using a lithium catalyst or a Ziegler catalyst in an inert solvent. The hydrogenated block copolymer may be obtained by hydrogenating the block copolymer thus obtained in the presence of a hydrogenation catalyst in an inert solvent.

Examples of the (hydrogenated) block copolymer include SBS, SIS, SEBS, SEPS and SEEPS. A particularly preferred (hydrogenated) block copolymer in the invention is a hydrogenated block copolymer with a weight average molecular weight of from 5,000 to 1,500,000, preferably from 10,000 to 550,000, more preferably from 10,000 to 150,000 which is composed of polymeric block A composed mainly of styrene and polymeric block B which is composed mainly of isoprene and in which 70 to 100% by weight of isoprene has 1,4-microstructure and 90% of the aliphatic double bonds derived from isoprene is hydrogenated. More preferably, 90 to 100% by weight of isoprene has 1,4-microstructure in the aforesaid hydrogenated block copolymer. Preferably, a polydispersity (Mw/Mn), i.e., a ratio of the weight average molecular weight (Mw) to the number average molecular weight(Mn), is preferably at most 10, more preferably at most 5, and most preferably at most 2. The (hydrogenated) block copolymer may have a molecular structure of straight, branched, or radiant chain or a mixture thereof. More preferably, 90 to 100% by weight of isoprene has 1,4-microstructure in the aforesaid hydrogenated block copolymer.

The hydrogenated random copolymer (b-2) is a random copolymer of at most 50 wt % of a vinyl aromatic compound with a conjugated diene compound and has a number average molecular weight of from 5,000 to 1,000,000, a polydispersity(Mw/Mn) of at most 10, and a vinyl bond content in its conjugated diene moieties, such as vinyl 1,2-bond and vinyl 3,4-bond, of at least 10%, preferably from 20 to 90%, particularly from 40 to 90%. If the content is less than 10%, a molded article obtained therefrom is hard to touch, which does not fit the present object. A content of the vinyl aromatic compound constituting component (b-2) is at most 50 wt %, preferably 5 to 35 wt %. If the content is higher than 50%, a molded article obtained therefrom is hard to touch, which does not fit the present object.

Any vinyl aromatic compound described for component (b-1) may be used as the vinyl aromatic compound of component (b-2) . The vinyl aromatic compounds are bonded randomly and a content of the vinyl aromatic compound bonded to make a block, determined according to the Kolthoff's method(I. M. Kolthoff, J.Polymer Sci., Vol.1, 429(1946)), is at most 10 wt %, preferably at most 5 wt %, based on a total weight of the bonded vinyl aromatic compound.

As the conjugated diene compound of component(b-2), any compound described for component (b-1), for example, butadiene, isoprene, 2,3-dimethylbutadiene, or pentadiene, may be used. Moreover, it is preferred that at least 90% of the aliphatic double bonds derived from the conjugated diene compound is hydrolyzed.

A weight ratio of component (a) to component (b) is in the range of from 40:60 to 95:5, preferably from 50:50 to 90:10, more preferably from 60:40 to 80:20.

(c) Organic Peroxide

Through dynamic cross-linking treatment using an organic peroxide, the composition is improved in heat resistance and abrasion resistance. Examples of the organic peroxide include dicumyl peroxide, di-tert.-butyl peroxide, 2,5-dimethyl-2,5-di(tert.-butylperoxy) hexane, 2,5-dimethyl-2,5-di(tert.-butylperoxy) hexine-3, 1,3-bis(tert.-butylperoxyisopropyl) benzene, 1,1-bis(tert.-butylperoxy)-3,3,5-trimethylcyclohexane, n-butyl-4,4,-bis(tert.-butylperoxy) valerate, benzoylperoxide, p-chlorobenzoyl peroxide, 2,4-dichlorobenzoyl peroxide, tert.-butylperoxy benzoate, tert.-butylperoxyisopropyl carbonate, diacetyl peroxide, lauroyl peroxide, and tert.-butylcumyl peroxide.

Among those, 2,5-dimethyl-2,5-di (tert.-butylperoxy) hexane, 2,5-dimethyl-2,5-di(tert.-butylperoxy) hexine-3 and 1,3-bis(tert.-butylperoxyisopropyl)benzene are most preferred in terms of smell, coloring and scorch stability.

The amount of the peroxide to be added is at least 0.01 part by weight, preferably at least 0.05 part by weight , and at most 3 parts by weight, preferably at most 2 parts by weight, per 100 parts by weight of components (a) and (b) in total. If the amount is less than the aforesaid lower limit, required crosslinking may not be obtained. Meanwhile, if the amount exceeds the aforesaid upper limit, the crosslinking proceeds so much as to decrease flowability of the composition and result in poor moldability of the composition.

(d) Crosslinking Aid

In the present invention, a crosslinking aid is used to increase a crosslinking efficiency of component(c). Examples of the crosslinking aid include polyvalent vinyl monomers such as divinylbenzene, triallylcyanurate; polyvalnet methacrylate monomers such as ethyleneglycol dimethacrylate, diethyleneglycol dimethacrylate, triethylenglycol dimethacrylate, polyethylenglycol dimethacrylate, trimethylolpropane trimethacrylate; 1,9-nonanediol dimethacrylate and and 2-methyl-1,8-ocutanediol dimethacrylate.

Particularly, in the present invention, triethylenglycol dimethacrylate is most preferred, because it is easy to handle and it solubilizes the organic peroxide to serve as a dispersion aid for the organic peroxide and, as a result, homogeneous crosslinking is efficiently attained by heat treatment, which gives a crosslinked thermoplastic elastomer balanced hardness and rubber elasticity.

The amount of the crosslinking aid to be added is at least 0.01 part by weight, preferably at least 0.05 part by weight, and at most 5.5 parts by weight, preferably at most 4 parts by weight, per 100 parts by weight of components (a) and (b) in total. If the amount is less than the aforesaid lower limit, the improvement in crosslinking may not be sufficient. Meanwhile, if it exceeds the aforesaid upper limit, the crosslinking proceeds so much that dispersion of the each component is hindered, resulting in bad moldability. It is preferred that the crosslinking aid is added in an amount of about 1.0 to 3.0 times as large as the amount of the peroxide added.

(e) Poly(Hydroxyalkyl(Meth)Acrylate)

Component (e),poly(hydroxyalkyl(meth)acrylate), improves compatibility of component (a) with (b). Examples of component(e) include 2-hydroxyethyl acrylate, 2-hydroxyethyl methacrylate, 2-hydroxypropylacrylate, 2-hydroxypropyl methacrylate, 3-chloro-2-hydroxypropyl methacrylate, 3-hydroxybutylacrylate, ethyl-2-hydroxyethyl fumarate, 2-hydroxybutyl acrylate, 4-hydroxybutyl acrylate, polymers thereof, copolymers thereof, and copolymers of one or more of the aforesaid (meth)acrylate with an other kind of monomer. Examples of the other monomer copymerizable with the above (meth)acrylate include ethylene, propylene, styrene, vinyl acetate, and vinyl chloride. Preferably, 2-hydroxymethacrylate is used.

The amount of component(e) to be added is at least 1 part by weight, preferably at least 1.3 parts by weight, and at most 20 parts by weight, preferably at most 10 parts by weight, per 100 parts by weight of components (a) and (b) in total. If the amount is less than the aforesaid lower limit, compatibility is not sufficiently improved. If the amount exceeds the aforesaid higher limit, a larger amount of gas generates in molding.

(f) Thermoplastic Polyurethane Elastomer

In the present invention, the thermoplastic polyurethane elastomer improves abrasion resistance and heat resistance of the composition.

Generally, the thermoplastic polyurethane elastomer is produced from a polyol, a diisocyanate, and a chain extender. Examples of the polyol include polyesterpolyol, polyesteretherpolyol, polycarbonatepolyol and polyetherpolyol.

Examples of the polyesterpolyol include those prepared by dehydration condensation reaction of aliphatic dicarboxylic acid such as succinic acid, adipic acid, sebacic acid, and azelaic acid; aromatic dicarboxylic acid such as phthalic acid, terephthalic acid, isophthalic acid, and naphthalene dicarboxylic acid; or alicyclic dicarboxylic acid such as hexahydrophthalic acid, hexahydroterephthalic acid and hexahydroisophthalic acid, esters thereof, or acid anhydrides thereof, with ethylene glycol, 1,3-propylene glycol, 1,2-propylene glycol, 1,3-butanediol, 1,4-butanediol, 1,5- pentanediol, 1,6-hexanediol, 3-methyl-1,5-pentanediol, neopentyl glycol, 1,8-octanediol, 1,9-nonanediol, or a mixture thereof; and polylactonediol prepared by ring-opening copolymerization of a lactone monomer such as ∈- caprolactone.

Examples of the polycarbonatepolyol include those prepared by reacting at least one polyhydric alcohol such as ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, and diethylene glycol, with diethylene carbonate, dimethyl carbonate, diethyl carbonate.

Examples of the polyesteretherpolyol include those prepared by dehydration condensation reaction of aliphatic dicarboxylic acid such as succinic acid, adipic acid, sebacic acid, and azelaic acid; aromatic dicarboxylic acid such as phthalic acid, terephthalic acid, isophthalic acid, and naphthalene dicarboxylic acid; or alicyclic dicarboxylic acid such as hexahydrophthalic acid, hexahydroterephthalic acid and hexahydroisophthalic acid, esters thereof, or acid anhydrides thereof, with glycol such as dietylene glycol and propylene oxide adducts or a mixture thereof.

Examples of the polyetherpolyol include polyethylene glycol, polypropylene glycol, polytetramethylene ether glycol prepared by polymerising ethylene oxide, propylene oxide, tetrahydrofuran, respectively, and copolyethers thereof.

Among the polyols mentioned above, polyetherpolyols are preferred because they are more resistant to hydrolysis.

Examples of the isocyanates to be reacted with the above-mentioned polyols include tolylene diisocyanate, 4,4'-diphenylmethane diisocyanate(MDI), 1,5-naphthylene diisocyanate, tolidine diisocyanate, 1,6-hexamethylene diisocyanate, isophorone diisocyanate, xylilene diisocyanate (XDI), hydrogenated XDI, triisocyanate, tetramethylxylene diisocyanate(TMXDI), 1,6,11-undecane triisocyanate, 1,8-diisocyanatemethyloctane, lysine ester triisocyanate, 1,3,6-hexamethylene triisocyanate, and bicycloheptane triisocyanate. Among those, 4,4'-diphenylmethane diisocyanate (MDI) is preferred.

As the chain extender, a low molecular weight polyol may be used, of which examples include aliphatic polyols such as ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, diethylene glycol, 1,4-cyclohexanedimethanol, and glycerol; and aromatic glycols such as 1,4-dumethyrolbenzene, bisphenol A, and addicts of ethylene oxide or propylene oxide to bisphenol A.

Component(f) is incorporated in an amount of at least 5 parts by weight, preferably 8 parts by weight, and at most 150 parts by weight, preferably at most 100 parts by weight, more preferably 80 parts by weight, per 100 parts by weight of component (a) and (b) in total. If the amount is less than the aforesaid lower limit, improvements in abrasion resistance and heat resistance are not sufficient. If it exceeds the aforesaid higher limit, a molded article obtained has worse weatherability. Also a backside of the molded article is so rough that a gas which is generated in shaping of a foaming resin on the backside of the article in a later process may leak through the rough parts in the backside.

If the present composition containing the polyurethane elastomer is used for a skin layer of an automobile interior part comprising an olefin core and a middle layer made of urethane foam, the automobile part can be crushed altogether and recycled.

(g) Liquid Polybutadiene

By incorporating liquid polybutadiene in the composition, heat resistance and abrasion resistance of the composition are improved.

Liquid polybutadiene is a transparent liquid polymer at room temperature in which microstructure of a main chain is composed of vinyl 1,2-bond, trans 1,4-bond and cis 1,4-bond. Preferably, the amount of the vinyl 1,2-bond is 30% by weight or less. If the vinyl 1,2-bond exceeds 30% by weight, low-temperature properties of the composition obtained tend to deteriorate, which is not preferable.

A number average molecular weight of the liquid polybutadiene is preferably at most 5,000, more preferably at most 4,000, and preferably at least 1,000, more preferably at least 2,000. If the number average molecular weight is below the lower limit, heat deformation resistance of the composition obtained tends to be worse. Meanwhile, if it exceeds the upper limit, the compatibility in the composition obtained tends to become worse.

The liquid polybutadiene is preferably a copolymerizable compound having one or more groups selected from epoxy, hydroxyl, isocyanate and carboxyl groups. Among these, one having a hydroxyl group and a copolymerizable unsaturated double bond is particularly preferred, for example, R-45HT, trade mark, ex Idemitsu Petrochemical Co.

Component (g) is incorporated in an amount of at most 20 parts by weight, preferably at most 10 parts by weight, and at least 0.1 part by weight, preferably at least 1 part by weight, per 100 parts by weight of component (a) and (b) in total. If the amount is below the lower limit, improvements in heat resistance and scratch resistance are not sufficient. Meanwhile, bleed-out may occur, if the amount exceeds the aforesaid upper limit.

(h) Unsaturated Carboxylic Acid or Derivative Thereof

By incorporating the unsaturated carboxylic acid or derivative thereof, compatibility of component(b) with component (f) is improved. Preferred examples of the unsaturated carboxylic acid or derivative thereof include acrylic acid, methacrylic acid, maleic acid, dicarboxylic acid or derivatives thereof such as acids, halides, amides, imides, anhydrides or esters. Particularly, maleic anhydride (MAH) is preferably used. Preferably, polypropylene is modified by the unsaturated carboxylic acid or derivative thereof. That is, it is believed that a soft segment in component (b-1), hydrogenated block copolymer, or hydrogenated conjugated diene moiety in component (b-2), hydrogenated random copolymer, and component(i), peroxide-decomposing type olefinic resin, are modified.

Component (h) is incorporated in an amount of at most 5 parts by weight, preferably at most 1 part by weight, and at least 0.05 part by weight, and preferably at least 0.1 part by weight, per 100 parts by weight of components (a) and (b) in total. If the amount is less than the aforesaid lower limit, the compatibility is not sufficiently improved. If the amount exceeds the aforesaid upper limit, a larger amount of gas evolves in a molding process, causing fogging and more pinholes in a molded article.

(i) Peroxide-Decomposing Type Olefinic Resin

Component(i) in the present invention improves dispersion of component (b) in the composition, appearance and heat resistance of a molded article.

Component(i) is incorporated in an amount of at least 0.05 part by weight, preferably at least 1 part by weight, and at most 30 parts by weight, preferably at most 10 parts by weight, per 100 parts by weight of components (a) and (b) in total. If the amount is less than the aforesaid lower limit, improvement in heat resistance is not sufficient; if the amount is more than the aforesaid upper limit, the composition is harder, which results in worse moldability.

A peroxide-decomposing type olefinic resin suitable for component (i) of the invention has at least 20% of rrrr/1- mmmm in a pentad ratio measured by a $^{13}$C- nuclear magnetic resonance method, a fusion peak temperature (Tm) of at least 150° C., and a fusion enthalpy (ΔHm) of at most 100 J/g as determined by differential scanning calorimetry (DSC). Preferably, Tm is in the range of from 150 to 167° C. and ΔHm is in the range of from 25 to 83 mJ/mg. Crystallinity may be estimated from Tm and ΔHm. If Tm and ΔHm are out of the aforesaid ranges, rubber elasticity at 100° C. or higher of the composition obtained is not improved.

Preferred peroxide-decomposing type polyolefin resin are high molecular weight propylene homopolymers such as isotactic polypropylenes, or copolymers of propylene with a smaller amount of other α-olefin such as ethylene, 1-butene, 1-hexene or 4-methyl-1-pentene. These resins preferably have an MFR (ASTM D-1238, Condition L, 230° C.) of 0.1 to 10 g/10 min., more preferably 3 to 8 g/10 min.

If the MFR of the peroxide-decomposing type olefinic resin is less than 0.1 g/10 min., moldability of the composition obtained is worse. If it exceeds 10 g/10 min., rubber elasticity of a composition obtained is worse.

In addition to the peroxide-decomposing type olefinic resin described above, use may be made of a peroxide-decomposing type olefinic resin composed of boiling heptane-soluble polypropylene having a number average molecular weight (Mn) of at least 25,000 and a ratio of Mw to Mn, Mw/Mn, of at most 7 and boiling heptane-insoluble polypropylene having a melt index of 0.1 to 4 g/10 min. and/or a peroxide-decomposing type olefinic resin composed of boiling heptane-soluble polypropylene having an intrinsic viscosity [η] of at least 1.2 dl/g and boiling heptane-insoluble polypropylene having an intrinsic viscosity [η] of 0.5 to 9.0 dl/g.

(J) Peroxide-Crosslinking Type Olefinic Resin

By incorporating the peroxide-crosslinking type olefinic resin, a tensile strength of the composition is improved.

As the peroxide-crosslinking type olefinic resin, use is made of one or more selected from polyethylene such as high density polyethylene (polyethylene prepared in a low pressure method), low density polyethylene (polyethylene prepared in a high pressure method), linear low density polyethylene (copolymers of ethylene with a smaller amount, preferably 1 to 10 mole %, of α-olefin such as butene-1, hexene-1 or octene-1); ethylene-propylene copolymer, ethylene-vinyl acetate copolymer, and ethylene-acrylate copolymer.

Particularly preferred is ethylene-octene copolymer having a density of at most 0.90 g/cm$^3$ or ethylene-hexene copolymer having a density of at least 0.90 g/cm$^3$ which are prepared using a metallocene catalyst (single site catalyst). When Tm of these copolymer is not higher than 100° C., it is necessary to add them and let them crosslink by the time of dynamic cross-linking treatment at the latest. By the crosslinking, Tm disappears and fusion of octene or hexene does not occur. If they are added after the dynamic cross-linking treatment, fusion of octene or hexene at 30 to 60° C. takes place and, consequently, heat resistance is decreased.

One example of component (j) an olefinic polymer which is prepared using a catalyst for olefine polymerization which is prepared in accordance with the method described in Japanese Patent Application Laid-Open No. S61-296008 and which is composed of a carrier and a reaction product of metallocene having at least one metal selected from the 4b group, 5b group and 6b group in the periodic table with alumoxane, the reaction product being formed in the presence of the carrier.

Another example of component (j) is an olefinic polymer prepared using a metal coordinated complex described in Japanese Patent Application Laid-Open No. H3-163008, which metal coordinated complex contains a metal selected from the group 3 (except scandium), groups 4 to 10 and the lanthanoid group and a delocalized π-bond part replaced with a constrained inducing part, and is characterized in that said complex has a constrained geometrical form around said metal atom, and a metal angle between a center of the delocalized substituted π-bond part and a center of at least one remaining substituted part is smaller than that in a comparative complex which is different the complex only in that a constrained inducing substituted part is replaced with a hydrogen, and wherein in each complex having further at least one delocalized substituted π-bond part, only one, per metal atom, of the delocalized substituted π-bond parts is cyclic.

If desired, a modified product of the aforesaid polyolefin may be used. Examples of such include (co)polymers modified with, for example, maleic anhydride, methyl methacrylate, glycidyl methacrylate, allylglycidylether, oxazolyl methacrylate, allyloxazolylether, carboxyl-methacrylate and allylcarboxylether. Among these, ethylene-glycidyl methacrylate copolymer, and polyethylene modified with glycidyl methacrylate or with maleic anhydride are preferred. Preferably, component(j) has an MFR, determined at 190° C. under a load of 2.16 kg, of from 0.1 to 300 g/10 min., more preferably from 0.3 to 200 g/10 min. Component(j) is incorporated in an amount of at most 30 parts by weight, preferably at most 20 parts by weight, and at least 0.05 part by weight, preferably at least 1 part by weight, per 100 parts by weight of components (a) and (b) in total. If the amount is less than the aforesaid lower limit, improvement in mechanical properties is not sufficient. If the amount is more than the aforesaid upper limit, the composition is harder to have worse moldability.

Other Components

In addition to the above-described components, the present compositions may contain mold release agents such as stearic acid, silicone oils, lubricants such as polyethylene wax, pigments, inorganic fillers such as alumina, antioxidant agents, inorganic or organic blowing agents, flame-retardants such as hydrated metal compounds, red phosphorus, ammonium polyphosphate, antimony, and silicones, in concentrations which do not adversely affect the present invention.

The present thermoplastic resin composition may be prepared by melt-kneading the aforesaid components in an arbitrary order or simultaneously. Preferably, all of the components except component(a), EVOH, are melt kneaded in a first step, and component (a) is added and melt kneaded in a second step, wherein parts of component(c), organic peroxide, and component(d), cross-linking aid, are added in the first step and the rest are added in the second step.

Any known means for melt-kneading can be used, for example, single screw extruders, twin screws extruders, rolls, Banbury mixers, and various kneaders. When a twin screws extruder is used, the melt-kneading is performed at a screw rotation speed of 100 rpm and at a temperature of from 180 to 240° C., preferably from 200 to 220° C.

EXAMPLES

The present invention will be further elucidated with reference to the following Examples and Comparative Examples, but shall not be limited to them.

Evaluation Methods

1. Pinholes in a molded article

Surface of a molded article obtained by rotational powder molding was observed through a magnifying glass at 5× magnification and rated according to the following criteria;

○:no pinhole,

Δ:pinholes in parts of the surface, and

X:pinholes throughout the surface.

2. Smoothness of a backside of a molded article

A backside of a molded article was illuminated with light at an incident angle of 60° and a gloss value of the reflected light from the backside was measured with a glossmeter, GMX-202, ex Murakami Shikisai Kenkyu-sho. Evaluation criteria are as follows;

◎:gloss value of 50 or larger,

○:gloss value of 10 or larger, and

X: gloss value of smaller than 10.

3. Agglomeration

Powder recovered in a powder box after a rotational powder molding was examined to see whether it agglomerated by heating or not. Evaluation criteria are as follows;

○: no agglomeration,

Δ: a little agglomeration, and

X : severe agglomeration.

4. Heat resistance

A resin composition was molded into a No.3 dumbbell test piece. The test piece was placed in a gear oven kept at 110° C. for 168 hours and then a degree of deformation of the test piece was measured. Evaluation criteria are as follows;

◎:deformation of 0%,

○:deformation of less than 5%, and

X:deformation of 5% or more.

5. Taber abrasion resistance

Determined in accordance with JIS K 7204 on a 2 mm-thick pressed sheet. Weight loss(mg) by abrasion was determined after 1,000 turns with a truck wheel, H-22.

6. Hardness(HDD)

Measured according to JIS K 7215 on a 6.3 mm-thick sheet prepared by pressing pellets made by melt-kneading, at 240° C.

7. Tensile strength(TS)

Determined according to JIS K7161 with a tension speed of 500 mm/min on a No.3 dumbbell test piece prepared from a press sheet of 1 mm thickness.

8. Modulus at 100% elongation(100% M)

Determined according to JIS K7161 with a tension speed of 500 mm/min on a No.3 dumbbell test piece prepared from a press sheet of 1 mm thickness.

9. Elongation(EL)

Determined according to JIS K7161 with a tension speed of 500 mm/min on a No.3 dumbbell test piece prepared from a press sheet of 1 mm thickness.

10. Tear strength

Determined according to JIS K6252 with a tear speed of 500 mm/min on a No.3 dumbbell test piece prepared from a press sheet of 2 mm thickness.

Materials Used

Component(a):EVOH (1) Melthene -H H6922X(trade name), ex Tosoh Co.,
Ethylene content 72 wt %, and
Degree of saponification: 90 wt %.

(2) Melthene -H H6920(trade name), ex Tosoh Co.,
Ethylene content : 72 wt %, and
Degree of saponification: 90 wt %.

Component(b):vinyl aromatic compound-conjugated diene compound copolymer and/or a hydrogenated derivative thereof (b-1) Septon 2002,ex Kuraray Co.,
styrene content:30% by weight,
isoprene content:70% by weight,
number average molecular weight(Mn) :55,000,
weight average molecular weight(Mw) : 60,000,
polydispersity (Mw/Mn): 1.09, and
hydrogenation degree : at least 90%.

(b-2) Dynalon 1320P(trade name), hydrogenated random copolymer(SBR), ex JSR Co.,
styrene content:10% by weight,
Mn : 300,000,
Mw/Mn :1, and
hydrogenation degree : at least 90%.

Component(c):organic peroxide, Perhexa 25B ( 2,5-dimethyl-2,5-di(tert-butylperoxy)hexane, ex Nippon Oils & Fats Co.

Component(d):crosslinking aid NK Ester 3G (triethylene glycol dimethacrylate), ex Shin-Nakamura Kagaku Co.

Component(e):(poly)hydroxy (meth)acrylate Rightester HO(trade name), 2-hydroxyethyl methacrylate(HEMA), ex Kyoeishya Kagaku Co.

Component(f): thermoplastic polyurethane resin Pandex T-8180 (trade mark) , ex Dainippon Ink Co.

Component(g): liquid polybutadiene R-45HT (trade mark) , ex Idemitsu Petrochemical Industries Inc.

Component(h): unsaturated carboxylic acid or a derivative thereof maleic anhydride, ex Kanto Kagaku Co.

Component(i): peroxide-decomposing type olefinic resin BC03C(trade mark), polypropylene, ex Mitsubishi Chemical Industries Inc.

Component(j): peroxide-crosslinking type olefinic resin FS370 (trade name), linear low density polyethylene, ex Sumitomo Chemical Co.

Other Components:

heavy calcium carbonate, NS400(trade name), ex Shiraishi Calcium Co., silicone oil, SH-200 1000CS(trade name),ex Toray Dow Corning Co.

Materials used in Comparative Examples:

ethylene-vinyl acetate copolymer, Ultrathene 680(trade name), Tosoh Co.,
ethylene content:80 wt %, and
MFR:160g/10 min.

ethylene-vinyl acetate copolymer, Ultrathene 760(trade name), Tosoh Co.,
ethylene content:58 wt %, and
MFR:70g/10 min.

EVOH, Melthene-H H6251(trade name), ex Tosoh co.,
ethylene content:72 wt %,
degree of saponification: 21.4 wt %, and
MFR:5g/10 min.

Preparation of the Compositions

The components except component (a), EVOH, were first kneaded in the weight ratios shown in Tables 1 and 2 in a twin-screw extruder. Then, parts of the peroxide (c) and the cross-linking aid(d) , if used, were added and dynamic cross-linking treatment was carried out at a kneading temperature of 210° C., a screw rotation of 350 rpm, and an extruder throughput of 20kg/hr. Then, component(a) was side-fed and the remaining parts of peroxide(c) and cross-linking aid(d), if any, were added and kneaded at 210° C. The compositions obtained were evaluated.

TABLE 1

| | Example 1 | Example 2 | Example 3 | Example 4 | Example 5 | Example 6 | Example 7 | Example 8 | Example 9 |
|---|---|---|---|---|---|---|---|---|---|
| component(a)(1) | 30 | 30 | 30 | 30 | 30 | 30 | 30 | 30 | 30 |
| component(a)(2) | 40 | 40 | 40 | 40 | 40 | 40 | 40 | 40 | 40 |
| component(b-1) | 30 | 0 | 30 | 30 | 30 | 30 | 30 | 30 | 30 |
| component(b-2) | 0 | 30 | 0 | 0 | 0 | 0 | 0 | 0 | 0 |
| component(c) | 0 | 0 | 0.18 | 0.18 | 0.18 | 0 | 0.18 | 0.18 | 0.18 |
| component(d) | 1 | 1 | 0.34 | 0.34 | 0.34 | 0 | 0.34 | 0.34 | 0.34 |
| component(e) | 0 | 0 | 0 | 1.5 | 1.5 | 0 | 1.5 | 1.5 | 1.5 |
| component(f) | 0 | 0 | 0 | 0 | 0 | 0 | 0 | 10 | 0 |
| component(g) | 0 | 0 | 0 | 0 | 0 | 0 | 0 | 0 | 3 |
| component(h) | 0 | 0 | 0 | 0 | 0 | 0 | 0 | 0.3 | 0 |
| component(i) | 0 | 0 | 0 | 0 | 3 | 3 | 0 | 0 | 0 |
| component(j) | 0 | 0 | 0 | 0 | 0 | 0 | 3 | 0 | 0 |
| Calcium carbonate | 5 | 5 | 5 | 5 | 5 | 5 | 5 | 5 | 5 |
| Silicone oil | 0.5 | 0.5 | 0.5 | 0.5 | 0.5 | 0.5 | 0.5 | 0.5 | 0.5 |
| total (parts by weight) | 105.5 | 105.5 | 106.02 | 107.52 | 110.52 | 108.5 | 110.52 | 117.82 | 110.52 |
| Pinholes | ⊚ | ⊚ | ⊚ | ⊚ | ○ | ○ | ○ | ⊚ | ⊚ |
| Backside smoothness | ⊚ | ⊚ | ○ | ○ | ○ | ○ | ○ | ○ | ○ |
| Agglomeration | ○ | ○ | ○ | ○ | ⊚ | ⊚ | ○ | ⊚ | ○ |
| Heat resistance | ○ | ○ | ⊚ | ⊚ | ⊚ | ⊚ | ⊚ | ⊚ | ⊚ |
| Taber abrasion | ○ | ○ | ○ | ○ | ○ | ○ | ○ | ⊚ | ○ |
| Hardness(HDD) | 44 | 33 | 44 | 44 | 45 | 45 | 38 | 40 | 40 |
| TS | 9.5 | 7.5 | 9.5 | 9.4 | 8.8 | 8.9 | 10.5 | 10 | 9.5 |
| 100% M | 8.2 | 7 | 9.3 | 9.2 | 9 | 8.4 | 9.1 | 9.5 | 9.3 |
| EL | 200 | 400 | 150 | 200 | 150 | 200 | 200 | 170 | 200 |
| Tear strength | 45 | 50 | 54 | 55 | 48 | 50 | 45 | 51 | 45 |

TABLE 2

(Comparative Examples)

| | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| component(a)(1) | 20 | 40 | 30 | 30 | 0 | 0 | 0 | 30 |
| component(a)(2) | 10 | 57 | 40 | 40 | 0 | 0 | 0 | 40 |
| Melthene-H H6251 | 0 | 0 | 0 | 0 | 0 | 0 | 70 | 0 |
| Ultrathene 680 | 0 | 0 | 0 | 0 | 70 | 0 | 0 | 0 |
| Ultrathene 760 | 0 | 0 | 0 | 0 | 0 | 70 | 0 | 0 |
| component(b-1) | 70 | 3 | 30 | 30 | 30 | 30 | 30 | 30 |
| component(b-2) | 0 | 0 | 0 | 0 | 0 | 0 | 0 | 0 |
| component(c) | 0 | 0 | 10 | 0.18 | 0 | 0 | 0 | 0 |
| component(d) | 0 | 0 | 10 | 0.34 | 0 | 0 | 0 | 0 |
| component(e) | 0 | 0 | 1.5 | 1.5 | 0 | 0 | 0 | 0 |
| component(f) | 0 | 0 | 0 | 0 | 0 | 0 | 0 | 200 |
| component(g) | 0 | 0 | 0 | 0 | 0 | 0 | 0 | 0 |
| component(h) | 0 | 0 | 0 | 0 | 0 | 0 | 0 | 0 |
| component(i) | 0 | 0 | 0 | 35 | 0 | 0 | 0 | 0 |
| component(j) | 0 | 0 | 0 | 0 | 0 | 0 | 0 | 0 |
| Calcium carbonate | 5 | 5 | 5 | 5 | 5 | 5 | 5 | 5 |
| Silicone oil | 0.5 | 0.5 | 0.5 | 0.5 | 0.5 | 0.5 | | |
| total (parts by weight) | 105.5 | 105.5 | 127 | 142.52 | 105.5 | 105.5 | 105 | 205 |
| Pinholes | Δ | ⊚ | X | X | ⊚ | ⊚ | ⊚ | ○ |
| Backside smoothness | X | ⊚ | X | X | ⊚ | ⊚ | ⊚ | X |
| Agglomeration | ⊚ | X | ⊚ | ⊚ | ⊚ | X | X | ⊚ |
| Heat resistance | ○ | Δ | ⊚ | ⊚ | X | X | X | ⊚ |
| Taber abrasion | Δ | Δ | ⊚ | ⊚ | Δ | X | X | ⊚ |
| Hardness(HDD) | 80A | 55 | 44 | 50 | 80A | 44 | 84A | 92A |
| TS | 9.5 | 18 | 8 | 8.7 | 4.2 | 10 | 8 | 10 |
| 100% M | 5 | 15 | 7.9 | 8.3 | 3.7 | 8 | 4.5 | 5 |
| EL | 600 | 300 | 100 | 150 | 600 | 400 | 600 | 500 |
| Tear strength | 45 | 100 | 37 | 55 | 52 | 46 | 42 | 60 |

Comparing Table 1 with Table 2, it is seen that the present resin composition causes no agglomeration and no pinholes, and a molded article therefrom has a smooth backside. The article also has superior resistance to heat and abrasion.

What is claimed is:

1. A thermoplastic resin composition comprising 40 to 95 parts by weight of (a) a saponified ethylene-vinyl acetate copolymer resin and 60 to 5 parts by weight of (b) at least one selected from the group consisting of copolymers of a vinyl aromatic compound with a conjugated diene compound, and hydrogenated derivatives thereof, characterized in that the saponified ethylene-vinyl acetate copolymer resin (a) has an ethylene content of 40 to 95 wt % based on a weight of the saponified ethylene-vinyl acetate copolymer resin and a degree of saponification of the vinyl acetate of at least 80 wt % and (b) at least one selected from the group consisting of copolymers of a vinyl aromatic compound with a conjugated diene compound and hydrogenated derivatives thereof is selected from the group consisting of (b-1) block copolymers of a vinyl aromatic compound with a conjugated diene compound, and hydrogenated derivatives thereof and (b-2) hydrogenated random copolymers of a vinyl aromatic compound with a conjugated diene compound, the copolymers having a vinyl aromatic compound content of at most 50 wt %, a number average molecular weight (Mn) of from 5,000 to 1,000,000, a polydispersity(Mw/Mn) of at most 10, and a content of vinyl bonds derived from the conjugated diene compound of at least 10% based on bonds derived from the conjugated diene compound.

2. The thermoplastic resin composition according to claim 1, wherein component (b) is a hydrogenated styrene-isoprene-styrene block copolymer having a weight average molecular weight of from 5,000 to 1,500,000, wherein 70 to 100 wt % of the isoprene is in 1,4-micro structure and at least 90% of aliphatic double bonds derived from the isoprene are hydrogenated.

3. The thermoplastic resin composition according to claim 1, wherein component (b) is a hydrogenated styrene-butadiene random copolymer wherein at least 70% of olefinic unsaturated bonds are hydrogenated.

4. The thermoplastic resin composition according to claim 1, wherein the composition further comprises 0.01 to 3 parts by weight of (c) an organic peroxide and 0.01 to 5.5 parts by weight of (d) a cross-linking aid, based on 100 parts by weight of component (a) and componenet (b) in total.

5. The thermoplastic resin composition according to claim 1, wherein the composition further comprises 1 to 20 parts by weight of (e) (poly)hydroxyalkyl (meth)acrylate, based on 100 parts by weight of component (a) and component (b) in total.

6. The thermoplastic resin composition according to claim 1, wherein the composition further comprises at least one component selected from the group consisting of 5 to 150 parts by weight of (f) a thermoplastic polyurethane resin, 0.1 to 20 parts by weight of (g) a liquid polybutadiene, 0.05 to 5 parts by weight of (h) an unsaturated carboxylic acid or a derivative thereof, 0.05 to 30 parts by weight of (i) a peroxide-decomposing polyolefin resin, and 0.05 to 30 parts by weight of (j) a peroxide-crosslinking polyolefin resin, wherein a total amount of component (a) and component (b) is 100 parts by weight.

* * * * *